US012186246B2

(12) United States Patent
Hacikadiroglu et al.

(10) Patent No.: US 12,186,246 B2
(45) Date of Patent: Jan. 7, 2025

(54) INDOOR AND OUTDOOR MOBILITY DEVICE SYSTEM

(71) Applicant: Matia Robotics Mekatronik Sistemler AR-GE Mühendislik Yazilim Sanayi ve Ticaret Anonim Sirketi, Istanbul (TR)

(72) Inventors: Necati Hacikadiroglu, Istanbul (TR); Enes Canidemir, Istanbul (TR)

(73) Assignee: MATIA ROBOTICS MEKATRONIK SISTEMLER AR-GE MUHENDISLIK YAZILIM SANAYI VE TICARET ANONIM SIRKETI, Istanbul (TR)

( * ) Notice: Subject to any disclaimer, the term of this patent is extended or adjusted under 35 U.S.C. 154(b) by 597 days.

(21) Appl. No.: 16/429,373

(22) Filed: Jun. 3, 2019

(65) Prior Publication Data

US 2019/0365585 A1 Dec. 5, 2019

(30) Foreign Application Priority Data

Jun. 5, 2018 (EP) .................................... 18175969

(51) Int. Cl.
*A61G 5/10* (2006.01)
*A61G 3/06* (2006.01)
(Continued)

(52) U.S. Cl.
CPC .............. *A61G 5/1083* (2016.11); *A61G 3/06* (2013.01); *A61G 5/042* (2013.01); *A61G 5/14* (2013.01)

(58) Field of Classification Search
CPC ........ A61G 5/1083; A61G 5/042; A61G 5/14; A61G 5/047; A61G 5/06; A61G 5/1086;
(Continued)

(56) References Cited

U.S. PATENT DOCUMENTS

| | | | | | |
|---|---|---|---|---|---|
| 3,890,010 | A | * | 6/1975 | Dove, Jr. | B60B 11/02 301/41.1 |
| 4,818,031 | A | * | 4/1989 | Brown | B60B 11/02 301/36.1 |

(Continued)

FOREIGN PATENT DOCUMENTS

| | | | | |
|---|---|---|---|---|
| EP | 2 691 063 | | 6/2017 | |
| GB | 2534870 | * | 8/2016 | B60B 15/26 |

(Continued)

OTHER PUBLICATIONS

English translation of WO 2004/016210 obtained from Espacenet.com (Year: 2017).*

(Continued)

*Primary Examiner* — Anne Marie M Boehler
(74) *Attorney, Agent, or Firm* — Nixon & Vanderhye P.C.

(57) ABSTRACT

The present invention relates to an indoor and outdoor mobility system 1 forming a mobility device 10 for people with walking disability, the system comprising a base 20 two indoor front wheels 30, which can be attached to the base 20; two outdoor front wheels 40, which can be removably attached to the base 20, wherein the outdoor front wheels 40, when attached to the base 20 comprise a wider track width compared to the indoor wheels 30; indoor back wheels 52 which can be attached to the base 20; and outdoor back wheels 62 which can be removably attached to the base 20, wherein the outdoor back wheels 62, when attached to the base 20 comprise a wider track width compared to the indoor back wheels 30. The invention further comprises a method for the change of a mobility device for people with walking disability from an indoor to an outdoor use.

15 Claims, 8 Drawing Sheets

Figure 1A:
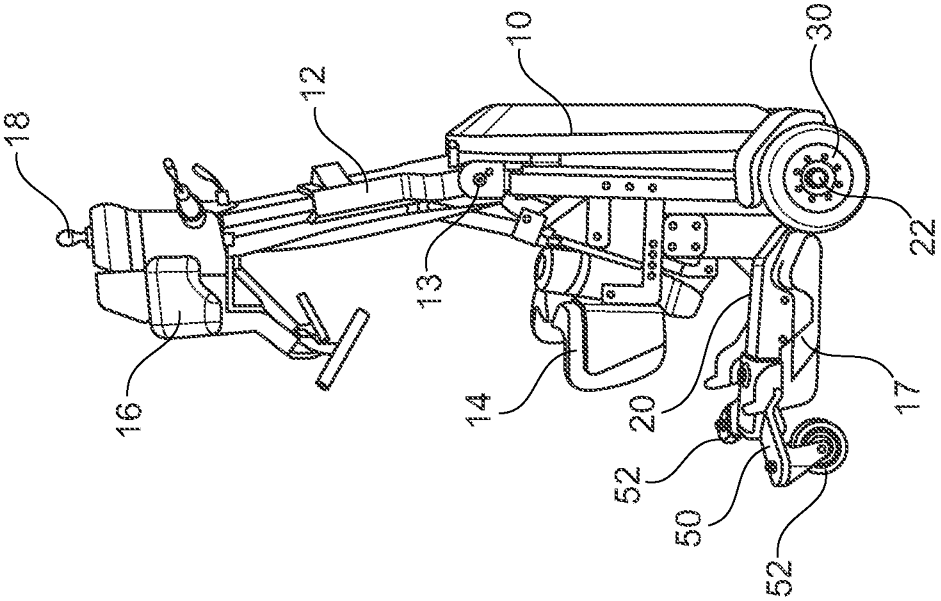

(51) Int. Cl.
*A61G 5/04* (2013.01)
*A61G 5/14* (2006.01)
*B60B 15/26* (2006.01)

(58) Field of Classification Search
CPC .... A61G 5/1089; A61G 2200/52; A61G 3/06; A61G 3/062; A61G 2003/043; A61G 2201/12; A61G 2201/1207; A61G 2203/0406; B60B 15/263; B62K 5/025; B62K 51/02
USPC ............ 414/921; 254/45; 280/7.1; 301/40.1, 301/40.2
See application file for complete search history.

(56) References Cited

U.S. PATENT DOCUMENTS

| | | | | | |
|---|---|---|---|---|---|
| 5,100,161 | A * | 3/1992 | Tillyer | A63C 17/015 | 301/5.307 |
| 5,105,915 | A * | 4/1992 | Gary | B66F 7/08 | 14/71.3 |
| 5,149,118 | A * | 9/1992 | Oxford | B62K 5/007 | 440/90 |
| 5,647,601 | A * | 7/1997 | Potter | B62B 7/00 | 280/33.998 |
| 6,053,519 | A * | 4/2000 | Poindexter | A61G 5/042 | 297/DIG. 10 |
| 6,125,957 | A * | 10/2000 | Kauffmann | B60L 50/52 | 297/DIG. 10 |
| 6,976,698 | B2 * | 12/2005 | Kuiken | A61G 5/1054 | 280/647 |
| 7,708,093 | B1 * | 5/2010 | Baker | A61G 5/14 | 180/65.1 |
| 8,641,359 | B2 * | 2/2014 | Fishbein | B62K 5/007 | 414/812 |
| 8,678,402 | B2 * | 3/2014 | Helterbrand | A61G 5/1018 | 280/30 |
| 10,555,846 | B2 * | 2/2020 | Jacobsson | A61G 5/045 | |
| 2006/0097557 | A1 * | 5/2006 | Tholkes | A61G 5/14 | 297/330 |
| 2009/0078482 | A1 * | 3/2009 | Kylstra | A61G 5/1037 | 180/65.1 |
| 2014/0035253 | A1 | 2/2014 | Helterbrand | | |
| 2014/0375022 | A1 * | 12/2014 | Kim | B62D 21/14 | 280/638 |
| 2015/0190293 | A1 * | 7/2015 | Hacikadiroglu | A61G 7/1019 | 5/87.1 |
| 2017/0113485 | A1 * | 4/2017 | Laffan | B62B 7/042 | |
| 2018/0001729 | A1 * | 1/2018 | Goffer | B60G 17/01908 | |
| 2018/0056152 | A1 * | 3/2018 | Reimers | B62B 3/106 | |
| 2020/0229999 | A1 * | 7/2020 | Chien | A61G 7/1059 | |
| 2020/0237602 | A1 * | 7/2020 | Bardgett | A61G 5/14 | |

FOREIGN PATENT DOCUMENTS

| | | | | |
|---|---|---|---|---|
| JP | 2004-073509 A | | 3/2004 | |
| JP | 3127565 U | | 12/2006 | |
| JP | 2011-110404 A | | 6/2011 | |
| JP | 2014-509543 A | | 4/2014 | |
| WO | 93/24342 | | 12/1993 | |
| WO | 2004/016210 | | 2/2004 | |
| WO | WO-2004016210 A1 | * | 2/2004 | A61G 5/00 |
| WO | WO 2012/130930 A1 | | 10/2012 | |
| WO | 2017/070361 | | 4/2017 | |

OTHER PUBLICATIONS

English translation of WO 2004/016210 obtained from espacenet.com (Year: 2004).*
WO2004016210 English machine translation obtained from espacenet.com (Year: 2004).*
Extended European Search Report for EP 18175969.7 dated Dec. 6, 2018, 9 pages.
Japanese Office Action dated Mar. 30, 2023 for JP Application No. 2019-103858.
JP Decision of Grant for JP Application No. 2019-103858.

* cited by examiner

1

INDOOR AND OUTDOOR MOBILITY DEVICE SYSTEM

This application claims priority to EP 18175969.7 filed Jun. 5, 2018, the entire contents of each of which is hereby incorporated by reference.

1. FIELD OF THE INVENTION

The present invention relates to a mobility system forming a mobility device for people with walking disability. The mobility device can be used both indoors and outdoors.

2. PRIOR ART

Mobility devices for disabled people are nowadays mostly provided in the kind of manually or electrically driven wheelchairs. By means of such devices the mobility of physically disabled people has heavily improved in daily life. Such electric or manual wheelchairs have the disadvantage of its high space consumption, such that some places within or outside a building are hardly or not at all accessible. Wheelchairs in general are designed such the person can sit thereon. Correspondingly, they are provided with a seat respectively seat faces or seat cushions.

In newer developments the mobility of physically disabled people is further improved in that the wheelchairs allow an erection of the person from the seated position into a standing or inclined lying position.

The document EP 2 691 063 B1 describes a newer indoor mobility device which provides an improved mobility and freedom for people with walking disability. Particularly, by this device the mobility of physically disabled people can be improved within buildings such that they require less external help in daily life and require less devices like wheel chairs, lifting devices or the like. Further, by means such device, the use of different common seating furniture and the free movement of the person within buildings is enabled without the need for a transfer from a seating furniture or bed into a wheelchair. For these tasks the indoor mobility device of the EP 2 691 063 B1 comprises a very compact shape with a small footprint. Due to this compact design this mobility device cannot be used outdoors with uneven ground.

On the other hand. Outdoor wheelchairs, particularly electric outdoor wheelchairs are very space consuming and are not easily usable indoors. Therefore, a person with walking disability usually has different specialized wheelchairs or mobility devices for indoor and outdoor use.

Overall, all mobility devices need different features to perform better in indoor and outdoor environments. Therefore, the wheelchair users have to give up some features they prefer for indoor use, if they want a better performing device for outdoor use and vice versa. Presently, wheelchair users usually have multiple devices to use in different environments.

Therefore, it is the problem of the present invention to overcome the above-mentioned drawbacks.

3. SUMMARY OF THE INVENTION

The above-mentioned problem is solved by an indoor and outdoor mobility system forming a mobility device for people with walking disability, according to claim 1, and by a method for the change of a mobility device for people with walking disability from an indoor to an outdoor use, according to claim 13.

Particularly the above mentioned problems are solved by an indoor and outdoor mobility system forming a mobility device for people with walking disability, the system comprising a base, two indoor front wheels, which can be attached to the base; two outdoor front wheels, which can be removably attached to the base, wherein the outdoor front wheels, when attached to the base comprise a wider track width compared to the indoor front wheels; indoor back wheels, which can be attached to the base; and outdoor back wheels, which can be removably attached to the base, wherein the outdoor back wheels, when attached to the base comprise a wider track width compared to the indoor back wheels (30).

The indoor and outdoor mobility system allows to form both an indoor and an outdoor mobility device by the use of suitable front and back wheels. Most of the parts of the mobility device can be used in both the indoor and the outdoor application. Therefore, basically one mobility device with some exchangeable or attachable parts can be used indoors and outdoors.

Mobility devices need different characteristics and features to perform better in indoor and outdoor environments. The mobility system comprises two indoor front wheels, which can be attached the base of the mobility device. By using indoor front wheels the indoor mobility device can be small and compact in shape to fit everywhere in an indoor environment. A small and compact shape also improves agility of the mobility device. Further, it is beneficial for stability reasons and for ergonomics that the indoor mobility device is close to the ground. Further the use of indoor front wheels allows to design them preferably smaller than front outdoor wheels. In addition, preferably, the front indoor wheels can be preferably harder than the front outdoor wheels which further improves indoor stability of the mobility device.

On the other hand, inventors have discovered that an outdoor mobility device should be larger than a compact indoor mobility device for stability reasons on uneven terrain. Thus, the track width of the outdoor front wheels, when attached to the front axles is wider than the track width of the indoor front wheels. Further the use of the outdoor back wheels the stability of the mobility device is improves as they have a wider track width than the indoor back wheels. Further, the use of particular outdoor front and back wheels allows to design them larger than the indoor front and back wheels, what improves the ground clearance of the mobility device such that it can better drive over obstacles. Further, outdoor front and back wheels can be made softer than the indoor front and back wheels, which improves traction and has a suspension effect, such that the user does not feel any small obstacle on uneven surfaces.

By using the mobility system of the present invention the user can adapt the mobility device to both indoor and outdoor applications and thus can improve the features of the common mobility device for each application. It is not required that the user buys different mobility devices for different applications. The indoor and outdoor mobility system offers users a cost effective and technically easy way to adapt their single mobility device from indoor to outdoor. So, the mobility device can perform best in both environments. Preferably the switch from indoor to outdoor and vice versa can be done by the user itself, when he is out of the mobility device or it can be done by a helper when the user is still on the mobility device.

Preferably, the outdoor front wheels and the outdoor back wheels comprise a longer wheel base, respectively, compared to the indoor front wheels and indoor back wheels, respectively. Thus, the wheel base of the mobility system increases, when either the outdoor back wheels or the outdoor front wheels or both are attached to the base. This provides a better stability, when the mobility system is used outdoors.

Preferably a longer wheel base can be provided by sliding motors of the driven axles or generally by shifting the axles forward.

Preferably the outdoor front wheels are attached to the base via simultaneously attached indoor front wheels. This is a convenient way of changing from indoor to outdoor front wheels, as the indoor front wheels do not need to be removed from the mobility device. The outdoor front wheels are preferably directly attached to the mounted indoor front wheels. This also provides automatically a wider the track width of the outdoor front wheels compared to the indoor front wheels. If the outdoor front wheels have a larger diameter than the indoor front wheels it is ensured that only the outdoor front wheels touch the ground during use.

Preferably the outdoor front wheels are attached to the indoor front wheels by a quick release mechanism, which can be operated without the use of tools. Thus, no tools are required for mounting the outdoor front wheels, which makes changing from indoor to outdoor use and vice versa fast and convenient.

Preferably, in an alternative embodiment the outdoor front wheels are attached to the base when the indoor front wheels are removed from the base. This further increases ground clearance near the front wheels and allows free adaptation of track width of the front wheels.

Preferably, the indoor front wheels and indoor back wheels are solid tires and the outdoor front wheels and outdoor back wheels are pneumatic tires. The use of solid tires improves stability of the mobility device for indoor use. The use of pneumatic tires improves traction and suspension of the mobility device for outdoor use.

Preferably, the outdoor front wheels have a larger diameter than the indoor front wheels and/or the outdoor back wheels have a larger diameter than the indoor back wheels. The use of smaller diameter indoor wheels improves the mobility device for indoor use as they make the mobility device smaller in height such that it fits in small indoor places. On the other hand, the use of larger diameter outdoor wheels improves ground clearance and suspension for outdoor use.

Preferably, the back wheels are caster wheels and smaller indoor caster wheels can be replaced by larger outdoor caster wheels. The larger outdoor caster wheels can preferably be attached to the smaller indoor caster wheels. Further, it is preferably possible to extend the track width for the outdoor configuration and use the same caster wheels as indoor and outdoor caster wheels.

Preferably, when the outdoor front wheels and the outdoor back wheels are used, the ground clearance of the mobility device is larger than when indoor front wheels and indoor back wheels are used.

Preferably, the indoor and outdoor mobility system further comprises individually and electrically driven front axles for driving the indoor and outdoor front wheels. The electrically driven front axles provide for an electrically driven mobility device. As they are individually driven, preferably by each having its own electric motor, an easy way of steering and a high agility of the mobility device is provided. By simply controlling the rotation direction and rotation speed of the front axles it is possible that mobility device drives back and forward and can be steered in any direction. The device can even turn around almost on the spot.

As an alternative solution the indoor and outdoor mobility system may comprise individually and electrically driven back axles for driving the indoor and outdoor back wheels. The electrically driven back axles also provide for an electrically driven mobility device. As they are individually driven, preferably by each having its own electric motor, an easy way of steering and a high agility of the mobility device is provided. By simply controlling the rotation direction and rotation speed of the back axles it is possible that mobility device drives back and forward and can be steered in any direction. The device can even turn around almost on the spot.

Preferably, the indoor and outdoor mobility system further comprising an indoor front or back tail element, removably attached to the base, wherein the indoor tail element supports the indoor back wheels or the indoor front wheels; and an outdoor front or back tail element, removably attached to the base, wherein the outdoor tail element supports the outdoor back wheels or the outdoor front wheels. The exchangeable indoor and outdoor tail element provide a convenient solution to change from indoor to outdoor back or front tires in one step. Further, the tail elements allow to vary the track width and wheelbase of the mobility device. The tail element can be arranged at the front or at the back side of the base, thus may support the front or the back wheels.

In another preferred embodiment the outdoor back wheels can be attached to the base without removing the indoor back wheels. In this case the smaller indoor back wheels can remain at the mobility device even when the larger outdoor back wheels are additionally attached.

Preferably, the outdoor tail element comprises a longer effective length than the indoor tail element. This particularly increases the wheelbase of the outdoor mobility device compared to the indoor configuration. A larger wheelbase increases longitudinal stability of the mobility device, such that the mobility device can be used on steeper uphill or downhill slopes.

Preferably, the outdoor tail element provides more space compared to the indoor tail element for arranging bigger wheels, preferably bigger caster wheels to maneuver better in an outdoor environment.

Preferably, the indoor tail element and the outdoor tail element can be secured to the base by a quick release mechanism, which can be operated without the use of tools. Thus, no tools are required for mounting the tail elements, which makes changing from indoor to outdoor use and vice versa fast and convenient.

Preferably, the indoor tail element and the outdoor tail element comprise a generally Y-shaped tail frame at which the indoor and outdoor back wheels are respectively supported. The generally Y-shape allows to attach the tail element at one central attachment point to the base and to provide a wide track width for the rear wheels. Therefore, the central attachment point can preferably be provided in-between left and right foot rests of the mobility device which safes mounting space and improves ergonomics.

Preferably, the indoor and outdoor back wheels are caster wheels. This use of caster wheels for the back wheels improves agility and maneuverability of the mobility device. Further, the mobility device can be easily steered by changing the rotation of the individually driven front wheels. The passive caster back wheels simply follow such steering movement in a very agile way.

Preferably the indoor and outdoor mobility system further comprising a lifting device for lifting the the mobility device such that the wheels are lifted from the ground. Therefore, the total weight of the mobility device will be carried by the lifting device and no weight will be on the wheels anymore. In case the mobility device is electrically driven, it is usually rather heavy. Likewise, manual mobility devices may be heavy, particularly, if the user is still using the mobility device during switching from the indoor configuration to the outdoor configuration. Therefore, the lifting device can lift the mobility device preferably at the base in a convenient way such that the wheels are lifted from the ground, such that switching or changing from indoor front wheels to outdoor front wheels and from indoor tail element to outdoor tail element or vice versa can be done in a convenient way. Preferably, it can even be done by a helper when the user is still standing on the mobility device.

Preferably, the lifting device comprises an upper platform that can be raised and lowered in parallel to the floor. This enables a parallel lifting of the mobility device, what makes it more convenient for a user still standing on the mobility device during the change.

The above-mentioned problems are also solved by a method for the change of a mobility device for people with walking disability from an indoor to an outdoor use, the method comprising the following steps:

a. attaching outdoor front wheels to the mobility device, wherein the outdoor front wheels, when attached to the mobility device comprise a wider track width compared to indoor front wheels;
b. attaching outdoor back wheels to the mobility device, wherein the outdoor back wheels, when attached to the base comprise a wider track width compared to indoor back wheels.

This method provides the same advantages as the indoor and outdoor mobility system described above. Preferably, it allows for an easy and fast change of a single mobility device from an indoor to an outdoor use.

Preferably, the track width and the wheel base of both the outdoor front wheels and the outdoor back wheels is increased compared to a configuration using the indoor front wheels and the indoor back wheels.

Preferably, the method for the change of a mobility device further comprises the steps of:

c. removing an indoor front or back tail element from a base of the mobility device, wherein the indoor tail element supports the indoor back wheels; and
d. attaching an outdoor front or back tail element to the base; wherein the outdoor tail element supports the outdoor back wheels.

The tail elements can be front or back tail elements as they can be attached to the front or back side of the base of the mobility device.

Preferably, the method for the change of a mobility device further comprises the step of:

d. lifting the mobility device by means of a lifting device such that the wheels are lifted from the ground.

The lifting is preferably done prior to removing the indoor tail element from the base. Further, a lowering of the mobility device by means of a lifting device can be done, such that the wheels touch the ground, preferably after the attaching of the outdoor front wheels to the base.

By these method steps switching or changing from indoor front wheels to outdoor front wheels and from indoor tail element to outdoor tail element or vice versa can be done in a convenient way. Preferably, it can even be done by a helper when the user is still standing on the mobility device.

Further preferred embodiments are described in the dependent claims.

4. SHORT DESCRIPTION OF THE DRAWINGS

Figure 1B:
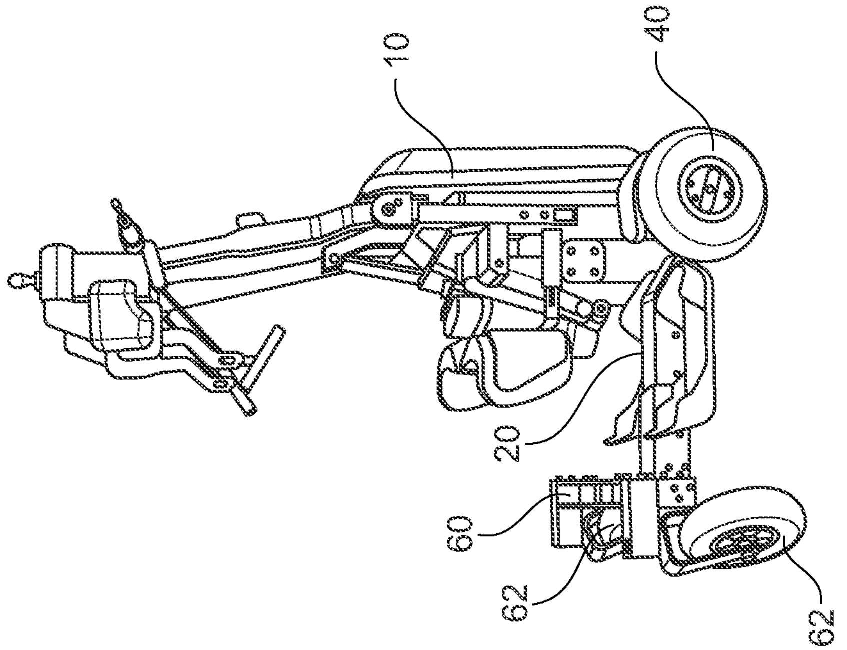
Figure 2D:
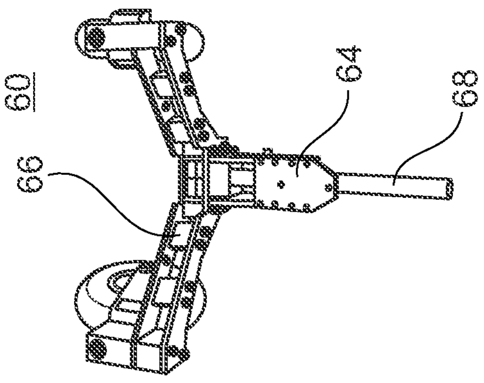
Figure 2C:
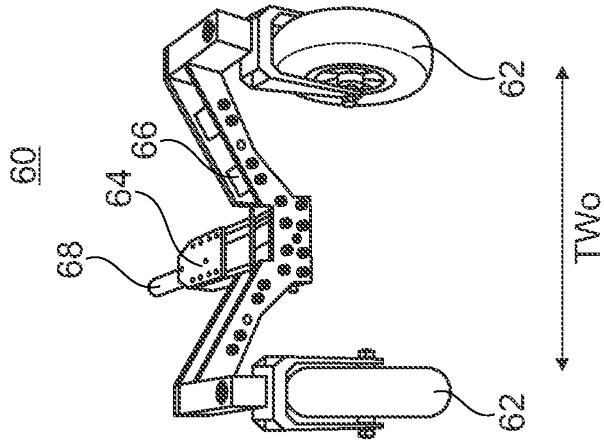
Figure 2B:
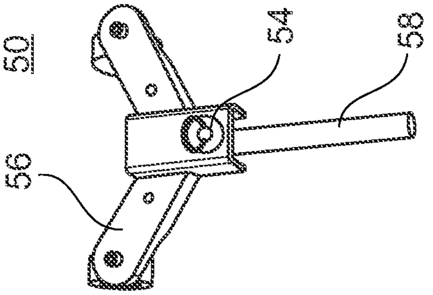
Figure 2A:
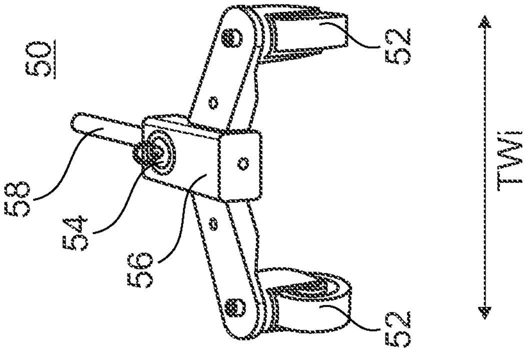
Figure 5:
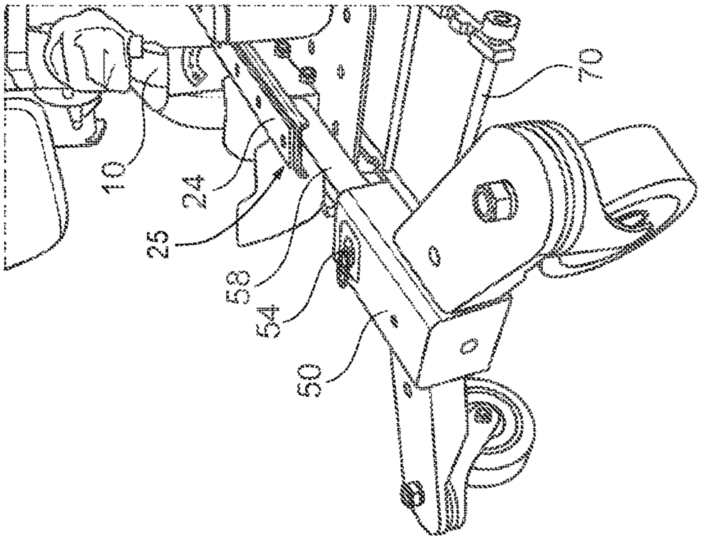
Figure 4:
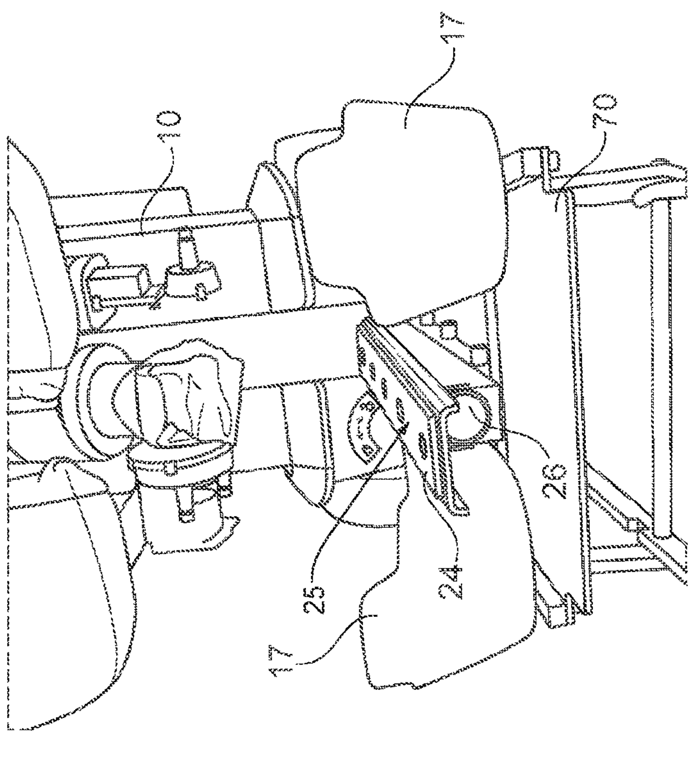
Figure 6C:
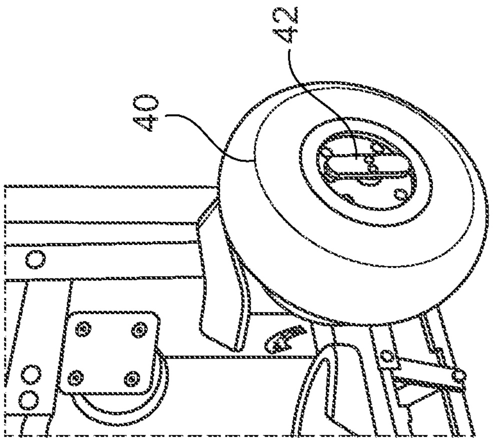
Figure 6B:
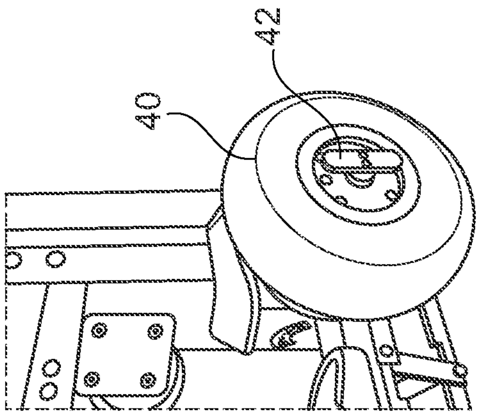
Figure 6A:
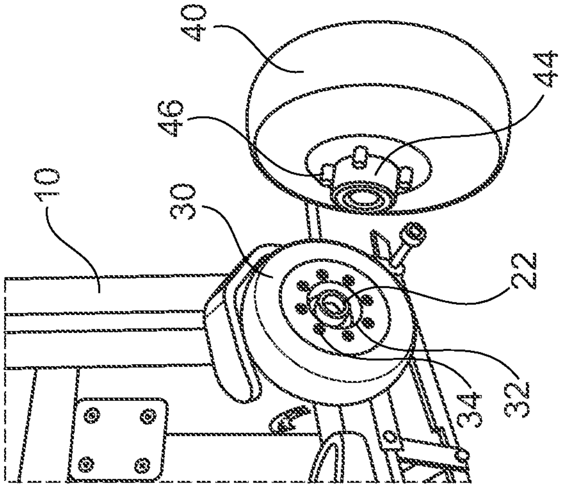
Figure 7:
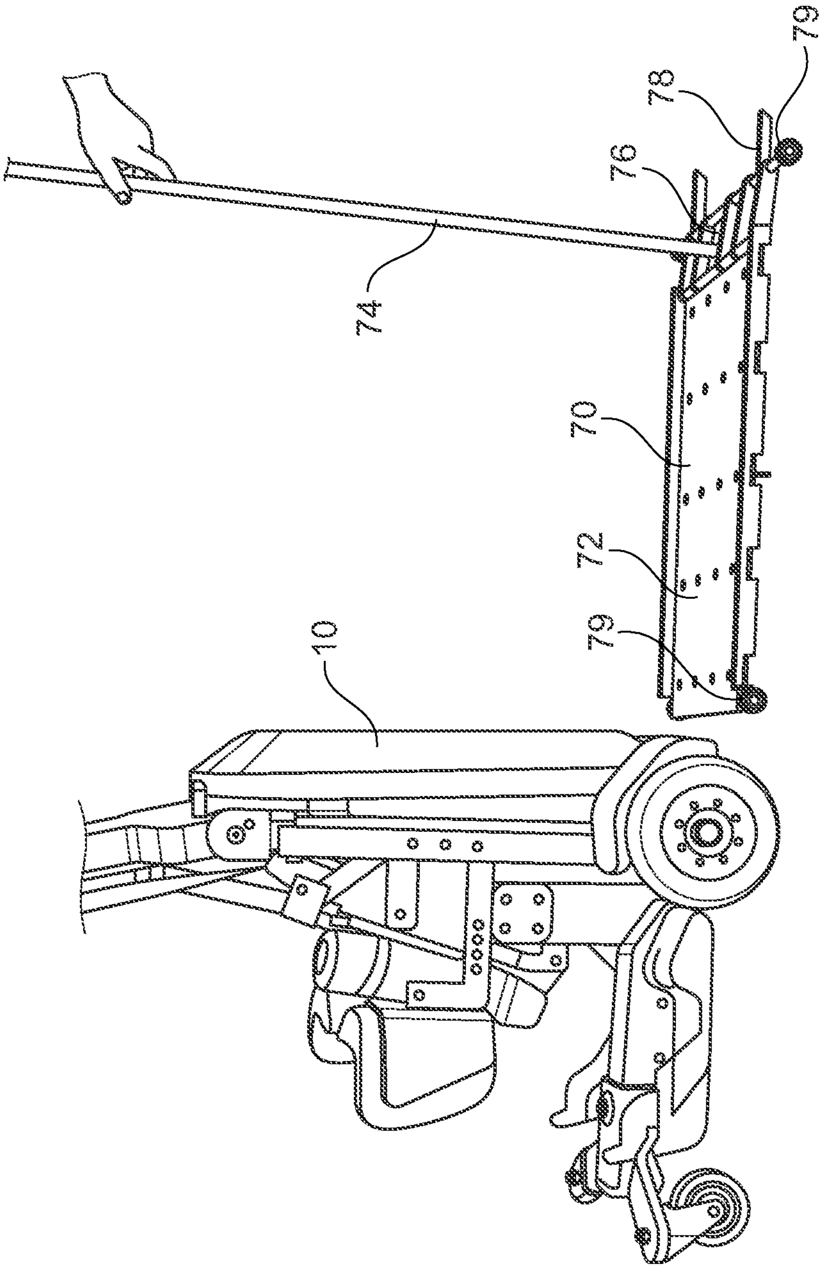
Figure 8A:
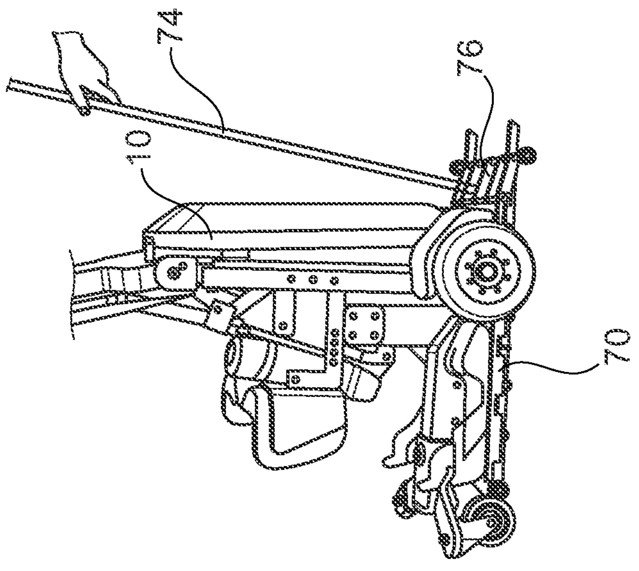
Figure 8B:
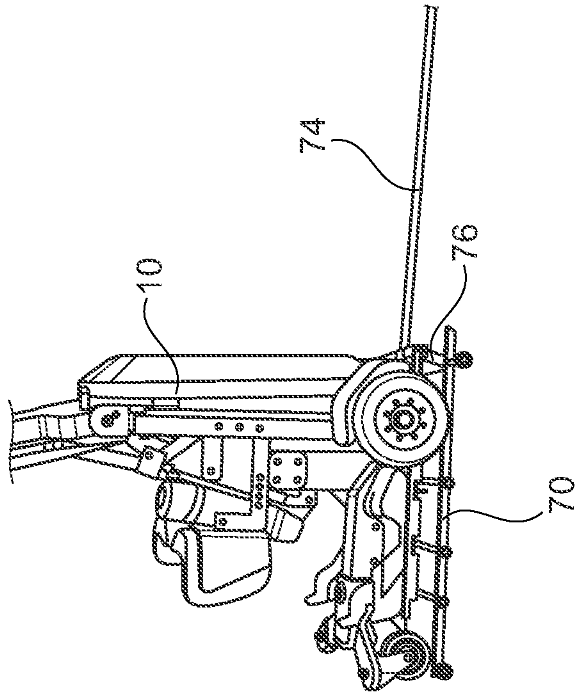
Figure 9:
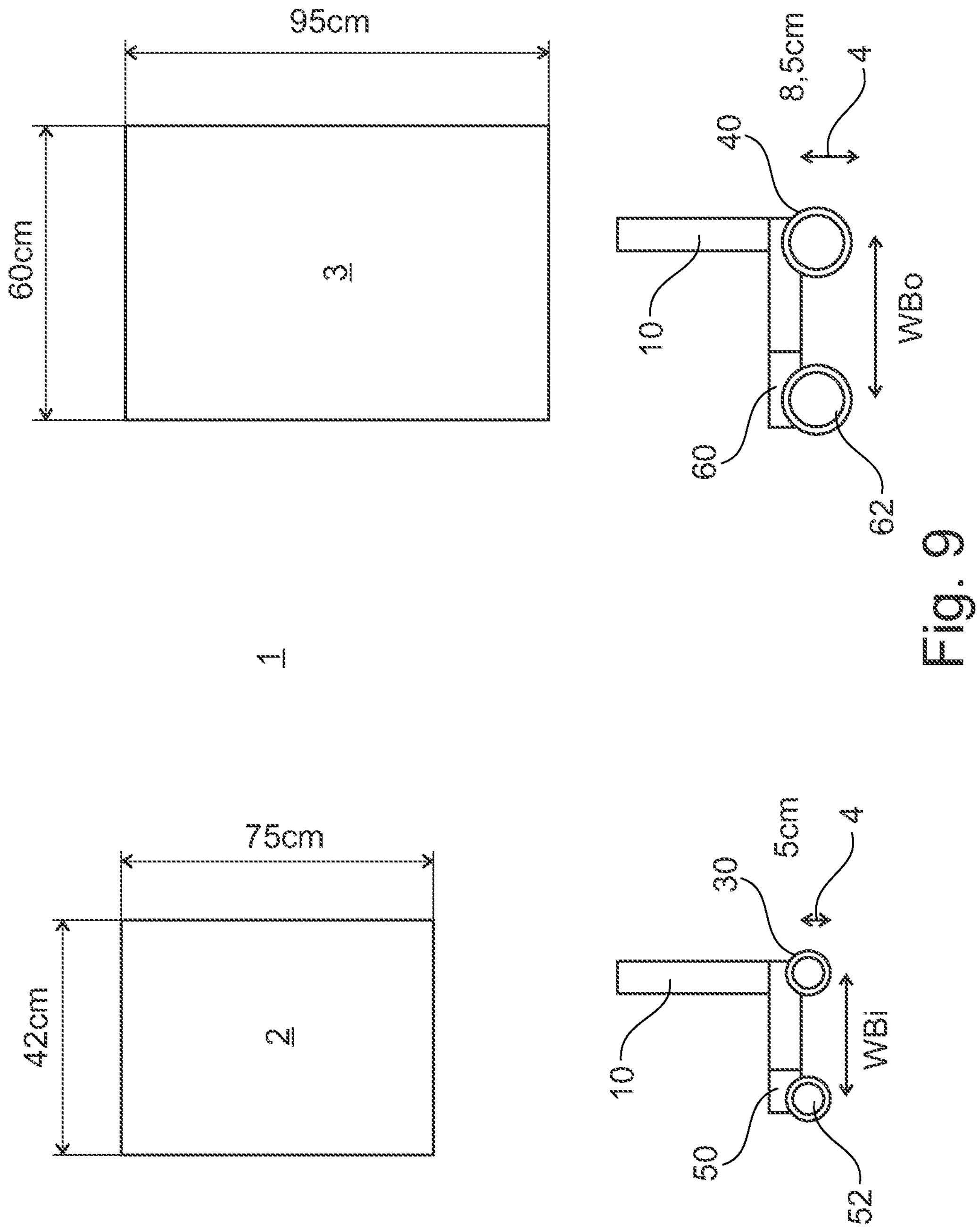

In the following further preferred embodiments of the invention are described with respect to the drawings in which shows:

FIG. 1A a three-dimensional side view of an embodiment of a mobility device in indoor configuration;

FIG. 1B a three-dimensional side view of the mobility device of FIG. 1A in outdoor configuration;

FIG. 2A and 2B a three-dimensional view of an embodiment of an indoor tail element;

FIG. 2C and 2D a three-dimensional view of an embodiment of an outdoor tail element;

FIG. 3A to 3D three-dimensional side views of an embodiment of a mobility device showing the sequence of changing an indoor tail element to an outdoor tail element;

FIG. 4 a three-dimensional rear view of an embodiment of a mobility device with removed tail element showing the attachment point for the tail element;

FIG. 5 a three-dimensional rear view of an embodiment of a mobility device with an indoor tail element in the process of attachment;

FIG. 6A to 6C three-dimensional partial side views of an embodiment of a mobility device showing the sequence of attaching an outdoor front wheel to an indoor front wheel;

FIG. 7 a three-dimensional partial side view of the mobility device of FIG. 1 and an embodiment of a lifting device;

FIG. 8A and 8B a three-dimensional partial side view of the mobility device and the lifting device of FIG. 7 in a sequence of lifting the mobility device; and FIG. 9 a schematic view showing a comparison of the dimensions of embodiments of an indoor and an outdoor mobility device.

5. DESCRIPTION OF PREFERRED EMBODIMENTS

In the following preferred embodiments of the invention are described with respect to the accompanying figures.

The indoor and outdoor mobility system can comprise a regular manual or electrically driven wheelchair (not shown) as mobility device. On such regular wheelchair the switch from indoor to outdoor use, and vice versa, can be done preferably by changing the caster front wheels from indoor front wheels with a smaller track width to outdoor front wheels with a larger track width, and adding a second pair of bigger outdoor back wheels onto the regular drive back wheels. The base is the frame of the wheelchair. In this way, the mobility device can perform best to its ability in both environments.

FIG. 1A and 18 show an embodiment of a mobility device to of the indoor and outdoor mobility system 1. The mobility device to is electrically driven and can be used by a user to drive around in a standing position. The mobility device comprises a rigid base 20 which preferably comprises electric motors, batteries and control electronics for individually driven front axles 22. The mobility device to further comprises a pivot arm 12, which has a pelvis support 16 for fixing a user's belly and control elements 18 at the top end. The pivot arm 12 is pivotably connected to the base 20 at a pivot joint 13, so that the pivot arm 12 can be pivoted to the back of the mobility device to. This allows the user to easily enter the mobility device to from the back side of the mobility device to and out of a seated position. Further, the user can adopt a "seated" position during use of the mobility device to for reaching positions that are arranged on a lower level. The mobility device to further comprises two footrests 17, that are arranged at the base 20 at a low level of the mobility device to. For stabilizing the user's tibia, the mobility device to further comprises a tibia support 14.

By means of such mobility device 10 the user preferably can on its own change from a seated to a standing position in which he can drive around freely. The control of the mobility device is preferably done by electronic control elements 18 like a joystick or a remote control.

FIG. 1A shows the mobility device 10 in an indoor configuration with two indoor front wheels 30 and an indoor tail element 50 attached. The indoor tail element 50 has two indoor back wheels 52, which are preferably caster wheels, at the end thereof. The shown indoor tail element 50 is a back tail element as it is attached to the back side of the mobility device 10. However, the mobility device 10 can generally also be configured (not shown) such that the indoor and outdoor tail elements 50, 60 are front tail elements and are attached to the front side of the mobility device 10. Then, the driven wheels would be the back wheels.

The indoor front wheels 30 and the indoor back wheels 52 are preferably solid tires, preferably solid rubber tires. Due to this comparably hard configuration of the indoor wheels 30, 52 stability of the mobility device 10 is improved during indoor use. This is particularly important since the mobility device 10 in indoor configuration comprises a very compact shape with a small footprint 2 of preferably only 42 cm×75 cm as it can be seen in FIG. 9. Thus, also the maximum track width TWi of the indoor front wheels 30 is preferably 42 cm. Further, as the indoor tail element 30 is comparably short, the wheelbase WBi of the mobility devices 10 is short and the overall length is preferably about 75 cm, only.

FIG. 1B shows the mobility device 10 in an outdoor configuration with two outdoor front wheels 40 and an outdoor tail element 60 attached. The shown outdoor tail element 60 is a back tail element as it is attached to the back side of the mobility device 10. The outdoor tail element 60 has two outdoor back wheels 62, which are preferably caster wheels, at the end thereof. The outdoor front wheels 40 and the outdoor back wheels 62 are preferably soft rubber tires, preferably pneumatic tires. Due to this comparably soft configuration of the outdoor wheels 40, 62 the suspension behavior and traction of the mobility device 10 is improved during outdoor use. Further, the outdoor wheels 40, 62 have a significant larger outer diameter compared with the outer diameter of the indoor wheels 30, 52. This increases the ground clearance 4 of the mobility device. As it can be seen in FIG. 9, in indoor configuration the ground clearance 4 is preferably about 5 cm, whereas in outdoor configuration the ground clearance is preferably about 8.5 cm.

For improving the stability of the mobility device 10 during outdoor use the outdoor tail element 60 comprises a wider track width TW0 of its wheels 62 than the track width TWi of the indoor tail element 50, see FIGS. 2A and 2C. Likewise, the track width of the outdoor front wheels 40 is wider than the track width of the indoor front wheels 30. Preferably, the maximum track width of indoor wheels 30, 52 is about 42 cm, whereas the maximum track width of the outdoor wheels 40, 62 is about 60 cm. In addition, for further improving the stability of the mobility device 10 during outdoor use, the outdoor tail element 60 is longer than the indoor tail element 50, such that, when attached, the wheelbase WB0 of the mobility device 10 in outdoor configuration is significantly longer than the wheelbase WBi in indoor configuration (see FIG. 9).

FIGS. 2A and 2B show an indoor tail element 50 in more detail. The indoor tail element 50 comprises a rigid Y-shaped tail frame 56 at which the indoor caster back wheels 52 are supported. The indoor tail element 50 further comprises a quick release mechanism 54 by which the indoor tail element 50 can be secured to a receptacle 24, 26 of the base 20. The quick release mechanism 54 can comprise a screw, splint, cam, catch, or similar element, which can be operated without the use of tools. The indoor tail element 50 further comprises a support pipe 58 that fits into a receptacle tube 26 at the base 20, see FIGS. 4 and 5 for providing a stable connection of the indoor tail element 50 to the other parts of the mobility device 10.

Similarly, FIGS. 2C and 2D show an outdoor tail element 60 in more detail. The outdoor tail element 60 comprises a rigid Y-shaped tail frame 66 at which the outdoor caster back wheels 62 are supported. The outdoor tail element 60 further comprises a quick release mechanism 64 by which the outdoor tail element 60 can be secured to a receptacle 24, 26 of the base 20. The quick release mechanism 64 can comprise a screw, splint, cam, catch, or similar element, which can be operated without the use of tools. The outdoor tail element 60 further comprises a support pipe 68 that fits into a receptacle tube 26 at the base 20, see FIGS. 4 and 5 for providing a stable connection of the indoor tail element 50 to the other parts of the mobility device 10.

Figure 3A:
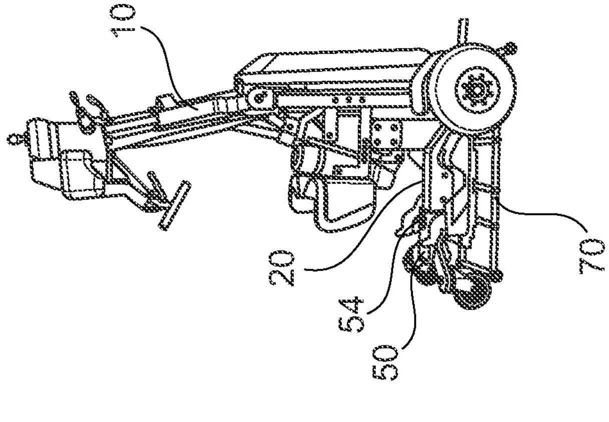
Figure 3B:
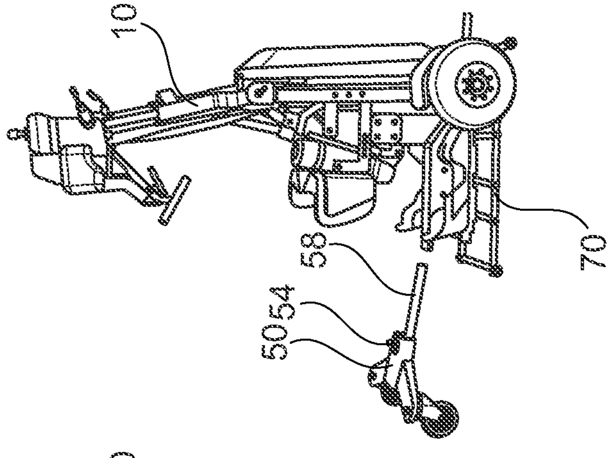
Figure 3C:
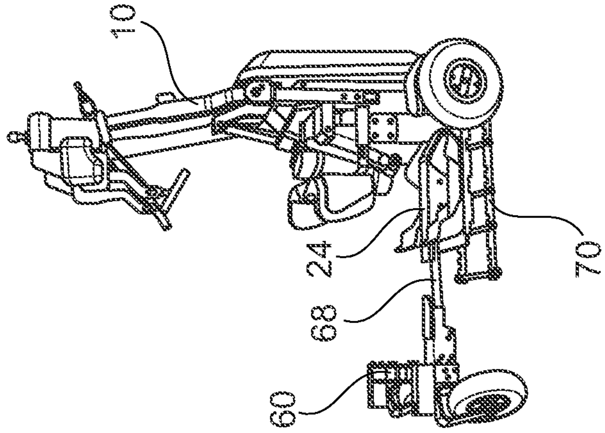
Figure 3D:
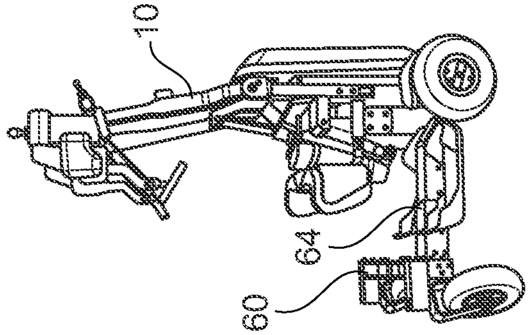

FIGS. 3A to 3D show a sequence of changing the tail elements 50, 60 of a mobility device form an indoor to an outdoor configuration. The change from an outdoor configuration to an indoor configuration is done in a correspondingly reverse manner. As shown in FIG. 3A the mobility device 10 is initially lifted by a lifting device 70 which attaches the base 20. This lifts the wheels 30, 40, 52, 62 from the ground. In this condition the quick release mechanism 54 can be manually operated to unlock the indoor tail element 50 from the base 20. If unlocked, the indoor tail element 50 can be pulled to the back and removed from the base 20 until it is separate, as it is shown in FIG. 3B. Then, as shown in FIG. 3C the outdoor tail element 60 can be attached by first inserting the support pipe 68 into the corresponding receptacle tube 26 at the base 20. This allows a good guidance for the further insertion of the outdoor tail element 60 at the base. In this condition, see also FIG. 5 for the indoor tail element 50, the outdoor tail element 60 can be pushed to the front of the mobility device 10 until it reaches a stop of the receptacle 24, 26. FIG. 3D shows the final position of the outdoor tail element 60 after insertion into the receptacle 24, 26. In this condition the quick release mechanism 64 can be manually operated or automatically engages for locking the outdoor tail element 60 securely to the base 20 of the mobility device 10.

Details of the receptacle 24, 25 at the base 20 can be seen in FIG. 4. In this embodiment the receptacle 24, 25 comprises the receptacle tube 26, which preferably extends horizontally to the front of the mobility device 10 and centrally within the base 20. Further, the receptacle 24, 25 comprises a fastening plate 24, which on the one hand provides a positive engagement with the tail frames 56, 66, for accepting forces of the tail elements 50, 60 and on the other hand acts as counter element for the quick release mechanisms 54, 64 for securing the tail elements 50, 60 to the base 20. The fastening plate 24 is preferably plate shaped and extends in longitudinal direction of the mobility device 10 to the back of the mobility device. The fastening plate 24 is preferably arranged at the base above the receptacle tube 26. FIG. 5 shows further details of the receptacle 24 and a quick release mechanism 54 of an indoor tail element 50. In FIG. 5 the indoor tail element 50 is partially connected, wherein the support pipe 58 is partially inserted into the receptacle tube 26.

FIGS. 6A to 6C show a sequence of changing from indoor front wheels 30 to outdoor front wheels 40, when the mobility device 10 is lifted by a lifting device 70. In this embodiment the outdoor front wheels 40 are connected to the front axles 22 indirectly via the indoor front wheels 30, which remain attached to the front axles 22. For a 2 secure and centered connection, the indoor front wheels 30 comprise an annular groove 32 in the rim into which an annular extension 44 of the rim of the outdoor front wheels 40 can be inserted, when the wheels are attached to each other. For transmission of driving moments the indoor front wheels 30 comprise preferably four bore holes 34 into which four corresponding pins 46 of the rim of the outdoor front wheels 40 can engage. When the outdoor front wheel 40 is attached to the corresponding indoor front wheel 30, as shown in FIG. 6B, a quick release mechanism 42 can be manually actuated for securing the outdoor front wheel 40 at the indoor front wheel 30. Preferably the quick release mechanism 42 can be operated without the use of tools. Preferably, the quick release mechanism 42 comprises a screw that can be rotated manually for locking the outdoor front wheel 40 to the indoor front wheel.

FIG. 7 shows an embodiment of a lifting device 70 for lifting a mobility device 10 in order to change from indoor configuration to outdoor configuration or vice versa. The lifting device comprises an upper platform 72 that can be raised and lowered in parallel to the floor. This allows that the user can remain on the mobility device 10 during configuration change. The platform 72 is connected to a floor support 78 via a parallel linkage 76. The parallel linkage is manually pivotable via an actuation bar 74 for lifting the platform 72. The lifting device 70 further comprises rolls 79 such that it can be easily placed below the base 20 and in-between the front wheels 30, 40. FIGS. 8A and 8B show the process of lifting the mobility device 10 by means of the lifting device 70. Thereby, the actuation bar 74 is moved from an essentially vertical position of FIG. 8A to an essentially horizontal position of FIG. 8B. During this movement the parallel linkage 76 attached to the actuation bar 74 moves from an essentials horizontal position to a vertical position and beyond this vertical position into a slightly inclined vertical position. In this slightly inclined vertical position of the parallel linkage 76 the upper platform 72 remains stable in lifted position such that the configuration change can be performed safely.

The indoor and outdoor mobility system 1 of this preferred embodiment comprises the mobility device 10, two indoor front wheels 30, two outdoor front wheels 40, an indoor tail element 40, an outdoor tail element 50 and preferably a lifting device 70. However, the indoor and outdoor mobility system 1 may further comprise further front wheels and further tail elements for other special applications and uses.

The indoor and outdoor mobility system 1 described above allows for an easy and fast change of a single mobility device 10 from an indoor to an outdoor use. Preferably, the indoor and outdoor mobility system 1 in outdoor configuration increases the ground clearance make the mobility device wider and longer and all four indoor wheels are changed to softer outdoor wheels that have bigger dimensions. This allows the essentially same mobility device to be able to drive over higher curbs, climb to higher ramps in outdoor configuration while the user feels comfortable on uneven ground. Further, the switch can be preferably done by the user when he is out of the device, or by a helper when the user is still on the device.

LIST OF REFERENCE SIGNS

1 indoor and outdoor mobility system
2 footprint of indoor mobility device
3 footprint of outdoor mobility device
4 ground clearance
10 mobility device
12 pivot arm
13 pivot joint
14 tibia support
16 pelvis support
17 foot rests
18 control elements
20 base
22 front axles
24 fastening plate of receptacle
26 receptacle tube
30 indoor front wheels
32 annular groove
34 bore holes
40 outdoor front wheels
42 quick release mechanism
44 annular extension
46 pins
50 indoor tail element
52 indoor back wheels
54 quick release mechanism
56 indoor tail frame
58 support pipe
60 indoor tail element
62 indoor back wheels
64 quick release mechanism
66 indoor tail frame
68 support pipe
70 lifting device
72 upper platform
74 actuation bar
76 parallel linkage
78 floor support
79 rolls

The invention claimed is:

1. An indoor and outdoor mobility system forming a standup mobility device for people with walking disability, configured to be used by a user to drive around in a standing position, the system comprising:
- a base;
- at least two indoor front wheels, attached to the base;
- at least two outdoor front wheels, configured to be removably attached to the base, wherein the outdoor front wheels, when attached to the base, comprise a wider track width compared to the indoor front wheels;
- indoor back wheels, configured to be removably attached to the base;
- outdoor back wheels, configured to be removably attached to the base, wherein the outdoor back wheels, when attached to the base, comprise a wider track width compared to the indoor back wheels; and
- individually and electrically driven front axles for driving the indoor front wheels and outdoor front wheels;

wherein the outdoor front wheels and the outdoor back wheels comprise a longer wheel base compared to the indoor front wheels and indoor back wheels;

wherein the outdoor front wheels have a larger diameter than the indoor front wheels and wherein the outdoor back wheels have a larger diameter than the indoor back wheels;

wherein when the outdoor front wheels and the outdoor back wheels are used, the ground clearance of the standup mobility device is larger than when indoor front wheels and indoor back wheels are used; and wherein the standup mobility device further sine-comprises a pivot arm pivotably connected to the base, the pivot arm comprising a pelvis support configured to fix a user's belly and a controller attached at a top end of the pivot arm for controlling operation of the standup mobility device.

2. The indoor and outdoor mobility system according to claim 1, wherein the indoor front wheels are attached to the individually and electrically driven front axles and the outdoor front wheels are attached to the indoor front wheels and the individually and electrically driven front axles extending through the indoor front wheels.

3. The indoor and outdoor mobility system according to claim 2, wherein the outdoor front wheels are attached to the indoor front wheels by a quick release mechanism, operable without the use of a tool.

4. The indoor and outdoor mobility system according to claim 1, wherein the outdoor back wheels are attached to the base when the indoor back wheels are removed from the base.

5. The indoor and outdoor mobility system according to claim 1, wherein the indoor front wheels and indoor back wheels are solid tires and the outdoor front wheels and outdoor back wheels are pneumatic tires.

6. The indoor and outdoor mobility system according to claim 1, further comprising:

an indoor back tail element, removably attached to the base, wherein the indoor back tail element supports the indoor back wheels; and an outdoor back tail element, removably attached to the base, wherein the outdoor back tail element supports the outdoor back wheels.

7. Indoor and outdoor mobility system according to claim 6, wherein the outdoor back tail element comprises a longer effective length than the indoor back tail element.

8. The indoor and outdoor mobility system according to claim 1, further comprising a lifting device for lifting wheels attached to the base from the ground.

9. The indoor and outdoor mobility system according to claim 1, wherein each of the indoor front wheels includes a plurality of bore holes circumferentially surrounding the front axle, and each of the outdoor front wheels includes an annular extension formed in a center of the outdoor front wheel and a plurality of annular extensions circumferentially surrounding the annular extension, the annular extension is configured to be inserted into a groove formed between an inner surface of the indoor front wheel and the front axle extending through the indoor front wheel, and the plurality of annular extensions are configured to be inserted into the corresponding plurality of bore holes.

10. A method for the change of a standup mobility device for people with walking disability, which can be used by a user to drive around in a standing position, from an indoor to an outdoor use, the method comprising:

attaching outdoor front wheels to the standup mobility device via indoor front wheels attached to a base of the standup mobility device, wherein the outdoor front wheels, when attached to the standup mobility device, comprise a wider track width compared to the indoor front wheels;

removing indoor back wheels removably attached to the base;

attaching outdoor back wheels to the base, wherein the outdoor back wheels, when attached to the base of the standup mobility device, comprise a wider track width compared to indoor back wheels; and providing individually and electrically driven front axles for driving the indoor front wheels and outdoor front wheels, and a pivot arm pivotably connected to the base, the pivot arm comprising a pelvis support configured to fix a user's belly and a controller attached at a top end of the pivot arm for controlling operation of the standup mobility device;

wherein the outdoor front wheels and the outdoor back wheels comprise a longer wheel base compared to the indoor front wheels and indoor back wheels;

wherein the outdoor front wheels have a larger diameter than the indoor front wheels and wherein the outdoor back wheels have a larger diameter than the indoor back wheels; and wherein when the outdoor front wheels and the outdoor back wheels are used, the ground clearance of the standup mobility device is larger than when indoor front wheels and indoor back wheels are used.

11. The method for the change of a standup mobility device according to claim 10 further comprising the steps of:

removing an indoor back tail element from the base of the standup mobility device, wherein the indoor back tail element supports the indoor back wheels; and attaching an outdoor back tail element to the base, wherein the outdoor back tail element supports the outdoor back wheels.

12. The method for the change of a standup mobility device according to claim 10 further comprising the step of:

lifting the mobility device by means of a lifting device such that wheels attached to the base are lifted from the ground.

13. A standup mobility device for people with walking disability and configured to be used by a user to electrically drive around indoor and outdoor while standing on the standup mobility device, the standup mobility device comprising:

a base configured to support the user standing on the standup mobility device;

at least two indoor front wheels, configured to be attached to the base;

at least two outdoor front wheels configured to be removably attached to the base, wherein the outdoor front wheels, when attached to the base, comprise a wider track width compared to the indoor front wheels;

indoor back wheels configured to be removably attached to the base;

outdoor back wheels configured to be removably attached to the base, wherein the outdoor back wheels, when attached to the base, comprise a wider track width compared to the indoor back wheels;

individually and electrically driven front axles for driving the indoor front wheels and outdoor front wheels, wherein the outdoor front wheels are attached to the indoor front wheels by a quick release mechanism, and wherein when the outdoor front wheels and the outdoor back wheels are used, the ground clearance of the standup mobility device is larger than when indoor front wheels and indoor back wheels are used; and a pivot arm pivotably connected to the base, the pivot arm comprising a pelvis support configured to fix a user's belly and a controller attached at a top end of the pivot arm for controlling operation of the standup mobility device.

14. An indoor and outdoor mobility system forming a standup mobility device for people with walking disability, configured to be used by a user to drive around in a standing position, the system comprising:

a base;

at least two indoor front wheels, attached to the base;

at least two outdoor front wheels, configured to be removably attached to the base, wherein the outdoor front wheels, when attached to the base, comprise a wider track width compared to the indoor front wheels;

indoor back wheels, configured to be removably attached to the base;

outdoor back wheels, configured to be removably attached to the base, wherein the outdoor back wheels, when attached to the base, comprise a wider track width compared to the indoor back wheels; and individually and electrically driven front axles for driving the indoor front wheels and outdoor front wheels;

wherein the outdoor front wheels and the outdoor back wheels comprise a longer wheel base compared to the indoor front wheels and indoor back wheels;

wherein the outdoor from wheels have a larger diameter than the indoor front wheels and wherein the outdoor back wheels have a larger diameter than the indoor back wheels;

wherein when the outdoor front wheels and the outdoor back wheels are used, the ground clearance of the standup mobility device is larger than when indoor from wheels and indoor back wheels are used;

wherein the standup mobility device further comprising a pivot arm pivotably connected to the base, the pivot arm comprising a pelvis support configured to fix a user's belly; and wherein each of the indoor front wheels includes a plurality of bore holes circumferentially surrounding the front axle, and each of the outdoor front wheels includes a plurality of annular extensions extending from a side of the outdoor front wheel and configured to be inserted into the corresponding plurality of bore holes.

15. The indoor and outdoor mobility system according to claim 14, comprising a quick release configured to attach the outdoor front wheels to the indoor front wheels, the quick release including a screw for locking the outdoor front wheels to the indoor front wheels.

* * * * *